Figure 1:
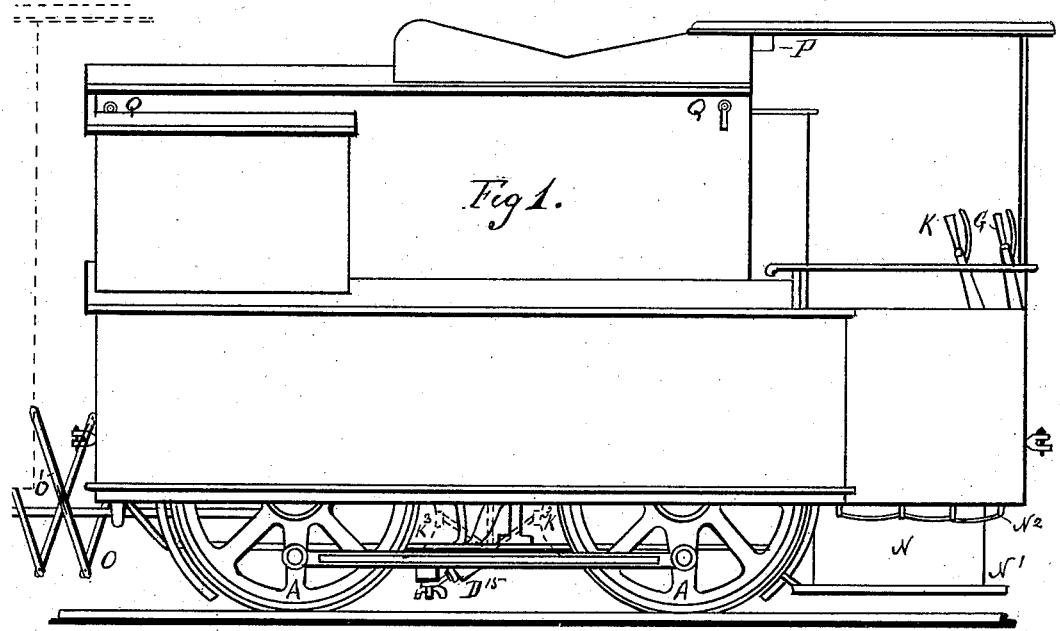

(No Model.) 4 Sheets—Sheet 1.

B. C. POLE.
MOTOR FOR STREET RAILWAYS.

No. 381,847. Patented Apr. 24, 1888.

Witnesses.
H. J. England,
H. S. Rohrer

Inventor
Benjamin C. Pole.

(No Model.) 4 Sheets—Sheet 2.
B. C. POLE.
MOTOR FOR STREET RAILWAYS.
No. 381,847. Patented Apr. 24, 1888.
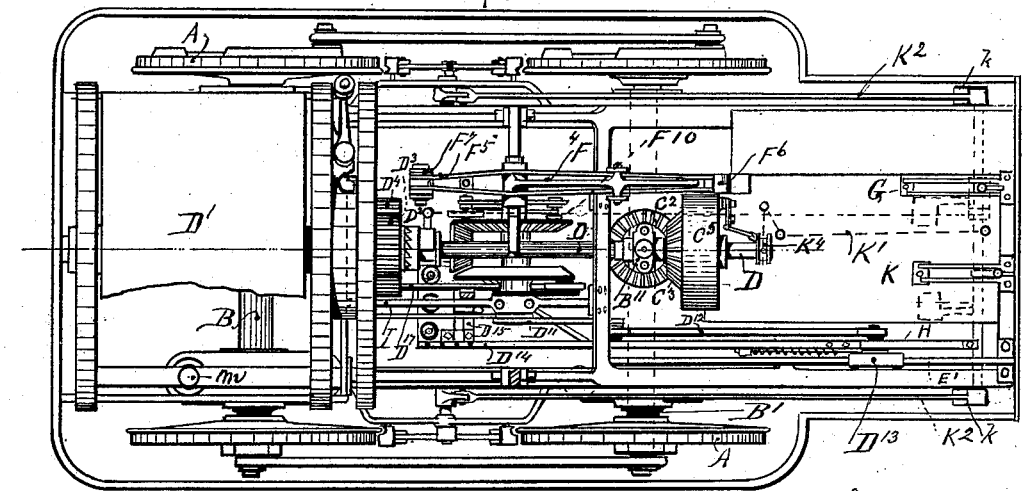
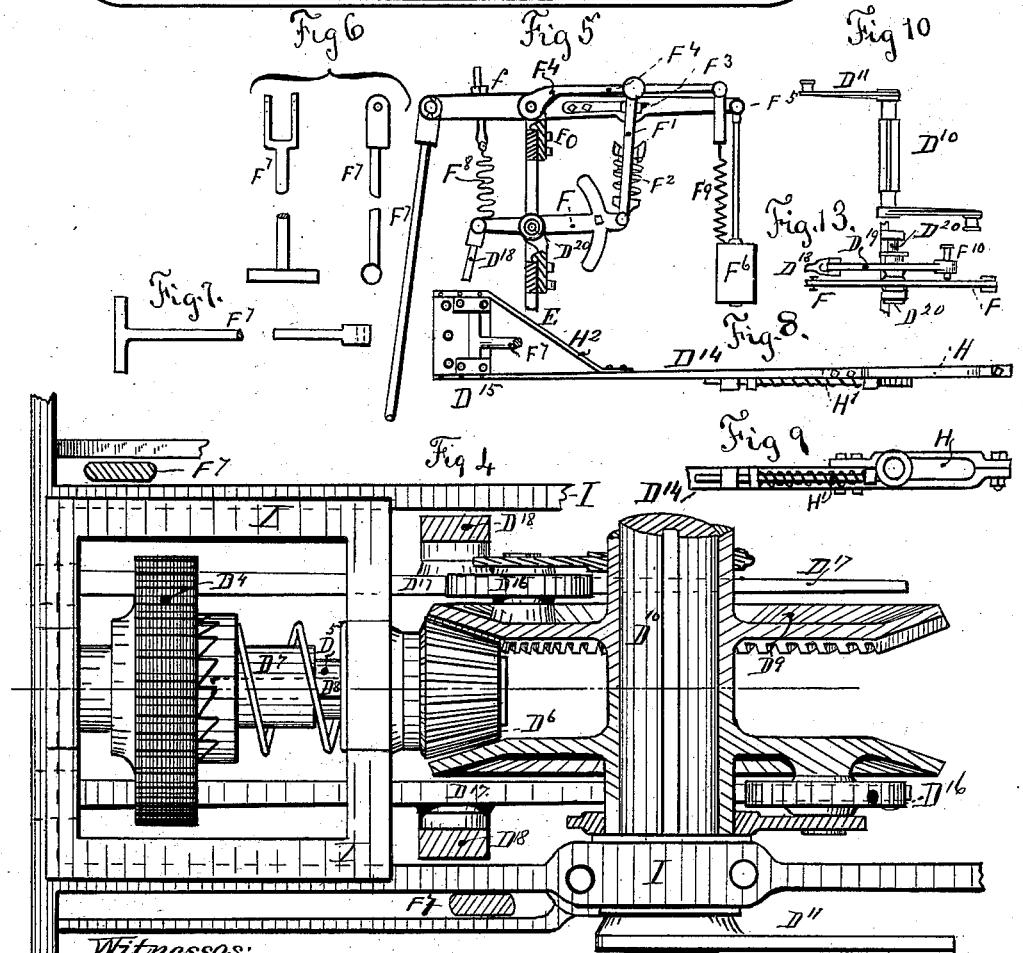
Witnesses:
H. J. England
H. A. Rohrer
Inventor:
Benjamin C. Pole.

(No Model.) 4 Sheets—Sheet 3.

B. C. POLE.
MOTOR FOR STREET RAILWAYS.

No. 381,847. Patented Apr. 24, 1888.

WITNESSES.
H. J. England.
H. S. Rohrer.

INVENTOR
Benjamin C. Pole.

(No Model.) 4 Sheets—Sheet 4.

B. C. POLE.
MOTOR FOR STREET RAILWAYS.

No. 381,847. Patented Apr. 24, 1888.

Witnesses:
J. B. McGinn.
Edward Sturtevant.

Inventor:
Benjamin C. Pole

UNITED STATES PATENT OFFICE.

BENJAMIN CHARLES POLE, OF CAMDEN, NEW JERSEY.

MOTOR FOR STREET-RAILWAYS.

SPECIFICATION forming part of Letters Patent No. 381,847, dated April 24, 1888.

Application filed June 11, 1886. Serial No. 204,874. (No model.)

*To all whom it may concern:*

Be it known that I, BENJAMIN CHARLES POLE, a citizen of the United States, residing at Camden, in the county of Camden and State of New Jersey, have invented certain new and useful Improvements in Triplex Motors for Street-Railways; and I do hereby declare the following to be a full, clear, and exact description of the invention, such as will enable others skilled in the art to which it appertains to make and use the same.

My invention relates to street-car motors; and the nature thereof consists in providing rods, connecting-rods, and rocking beams with springs to operate the foot of the motor, instead of cylinders and pistons, as shown in Letters Patent No. 129,984, dated July 30, 1872, No. 335,479, dated February 2, 1886, and No. 365,273, June 21, 1887; also in providing a friction-brake upon the main driving-shaft to start and operate the driving-wheels of the motor and making a clutch on the main shaft to start and operate the foot mechanism, this device consisting of connecting-rods, vibrating beams, and springs attached to a balance-beam that is raised and lowered by the action of the beforementioned vibrating beams; also, in a connecting-rod from the crank-axle to guides, to operate a pushing-leg, and in providing the crank-axle with cams to operate the beforementioned vibrating beams; also, in providing a loop at the end of the pushing-leg to allow the foot to swing backward when coming in contact with the ground; and, still further, in providing a spring-clutch that will permit the crank and cams to be turned around by the foot's contact with the ground free and independent of the motive power of the motor, as in the instance of the motor running downhill—then the foot coming to ground can pass back in the motor and not arrest the speed of the motor; in providing a reversing system consisting of sliding beveled pinions on the main driving-axle, and an arm for holding an intermediate power-shaft in position, the construction being such that it will permit the ready removal of the shaft from the arm and the arm from the axle; in providing a single driving-lever to apply the brakes when pulled backward and to operate a friction-clutch when pushed forward, thereby attaching the motive power to the driving-wheels, and in providing a second lever to start and stop the foot mechanism.

Figure 2:
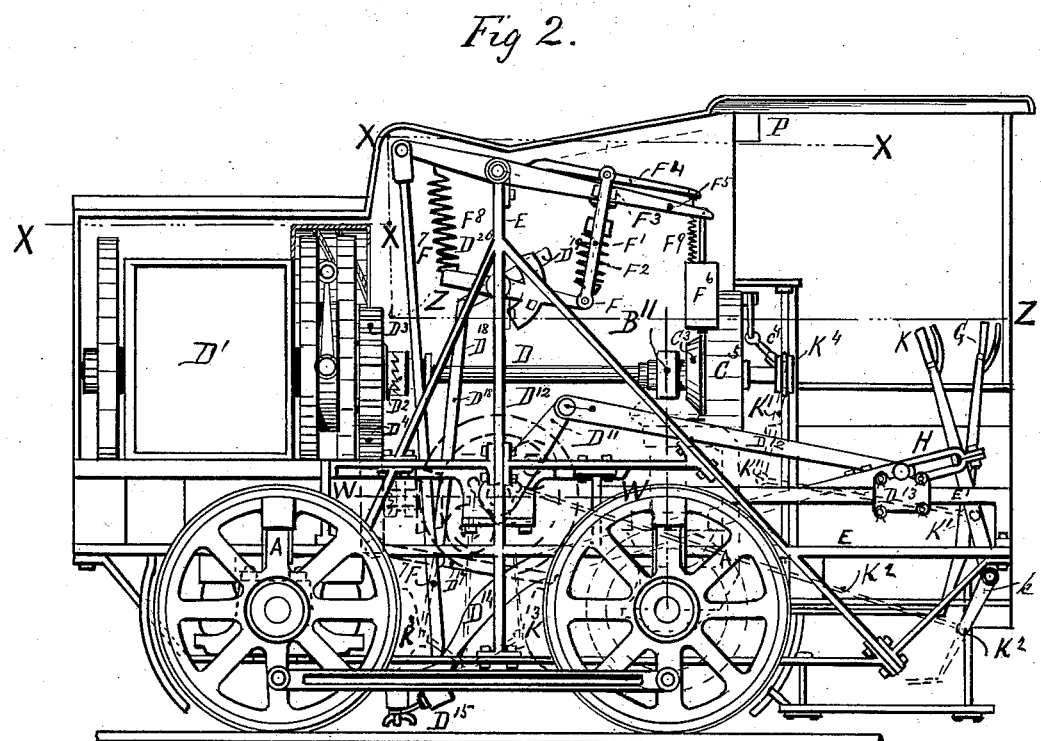

In the drawings, Figure 1 is a side elevation of my motor, showing the case, the driving-lever, the connecting-rod between the driving-wheels, part of the foot, the toggle-brake for the driving-wheels, (shown dotted in,) and the lazy-tongs connection between the motor and car. Fig. 2 is a side elevation in part section of Fig. 1, with the case removed, and shows the construction of the foot mechanism and its connection with the crank-axle, (in dotted lines;) shows the levers that are designed to operate the foot; also the beveled pinions which are made to operate the main driving-axle of the motor; also the pinions that are to operate the crank-axle of the foot mechanism; also the connecting-rods of the foot mechanism; also the box for the motive power. Fig. 3 is a part sectional plan showing the position of the four driving-wheels and connecting-rods; also the upper part of the plan shows the top over the balance-beam in its relative position taken on a line X X X X of Fig. 2, and the lower part of the plan is taken on a line X X, and thence to Z Z of Fig. 2, and shows the connection of the foot, crank-axle connecting rod to guide, the position of the pushing-leg, together with its extension-loop and spring at the end thereof; also shows the nest of beveled wheels and the outer case of the friction-brake; also shows the clutch belonging to the foot mechanism that connects it to the main shaft. Fig. 4 is an enlarged sectional plan of the central frame of the motor on the line W W of Fig. 2, showing the beveled wheel that is upon the crank-axle of the foot mechanism; also showing the clutch that is provided with a spring action for the purpose of permitting the foot mechanism to pull around the crank-axle; also shows in section the position of the two thrust-rods as they reach down and pass the side of the frame. Fig. 5 is a part sectional elevation of the upper supports of the balance-beam and part of the thrust-rod connected therewith; also shows the springs and smaller beams for operating the balance-beam; also shows the connecting-rod of the intermediate beam. Fig. 6 represents the T and clevis construction of the thrust-rod of the foot mechanism, and is illustrated in two positions—front and side. Fig.

Figures 11, 12:
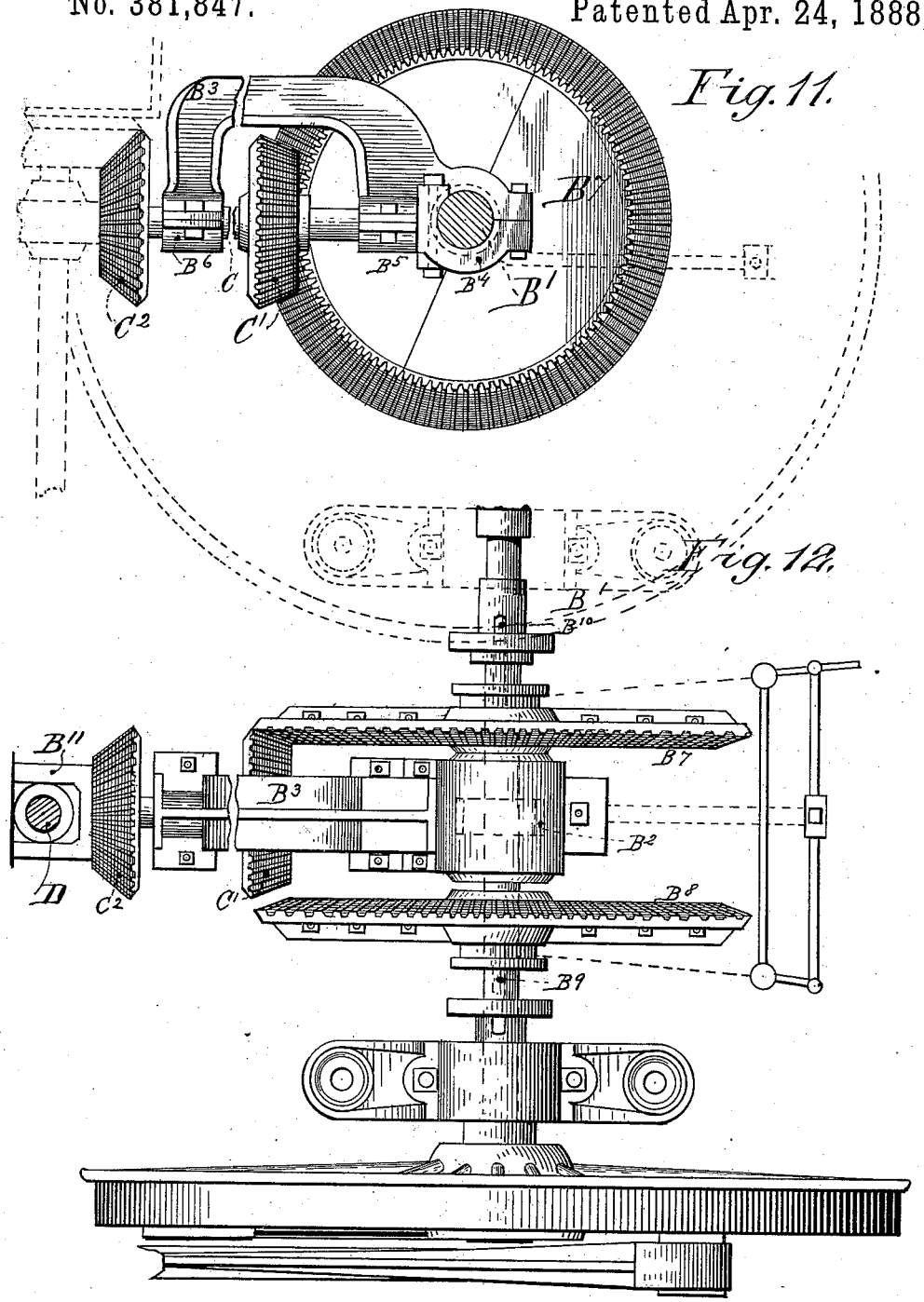
Figure 14:
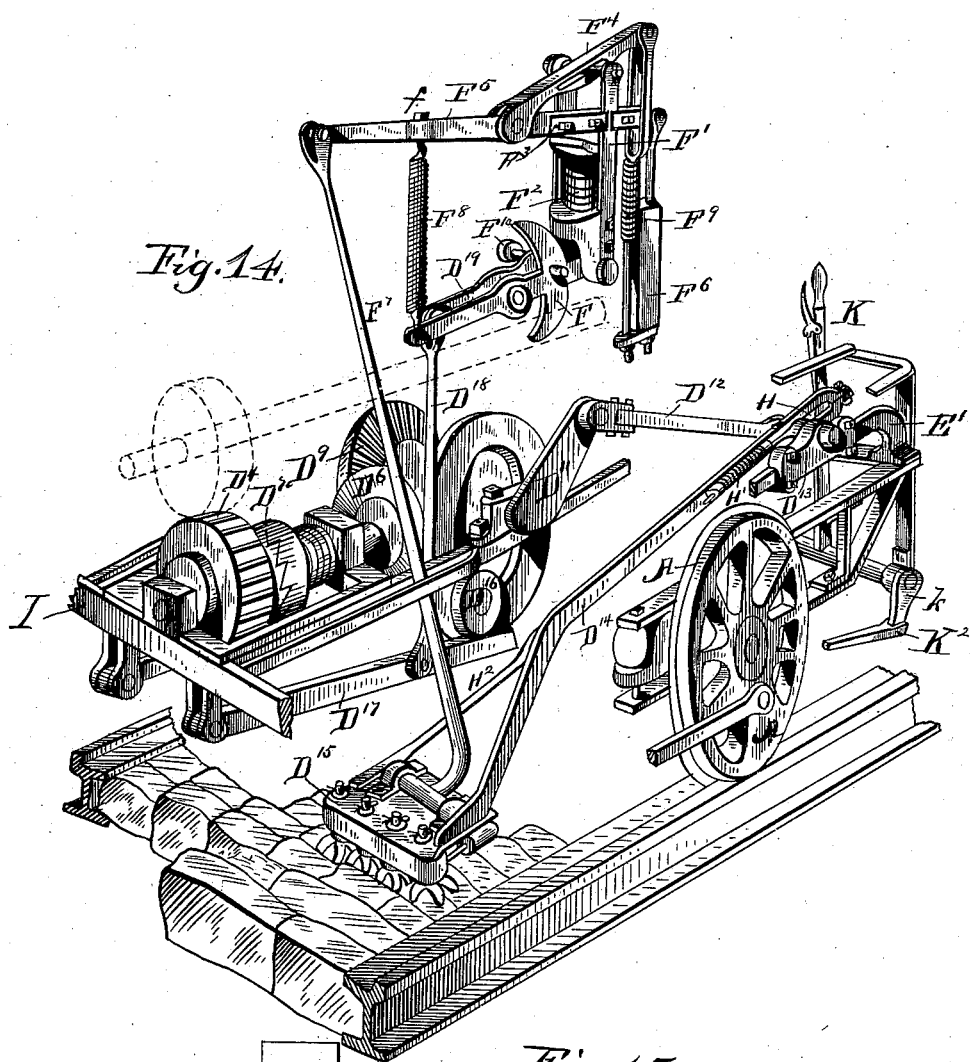
Figure 15:
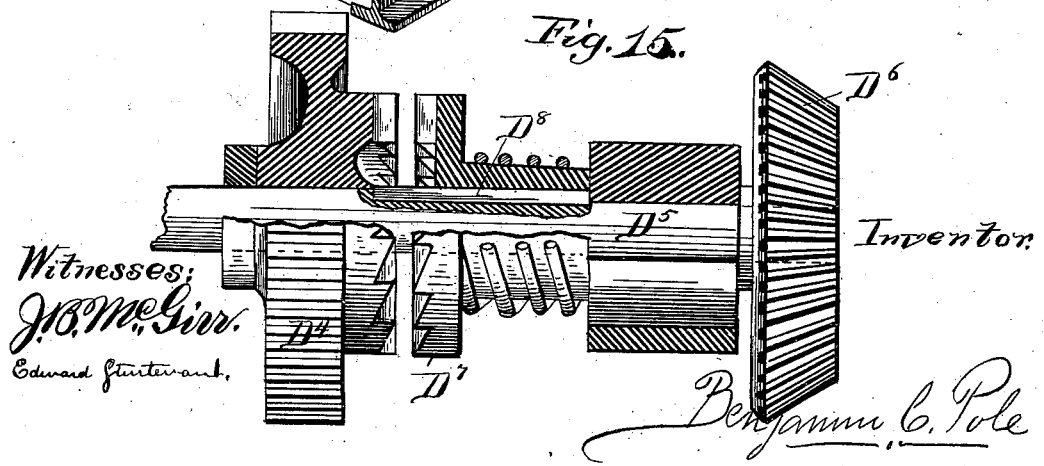

7 shows a modification of Fig. 6, and shows an eye to take the place of the clevis of the thrust-rod. Fig. 8 is a plan of the pushing-leg of the foot mechanism, and shows the foot-plate attached to a short connection of the thrust-rod; also shows a strut to keep the foot square to its work; also at the upper end shows the loop and spring eyebolt, by which it is connected to the slide or guide of the motor and to the connecting rod of the crank-axle. Fig. 9 is a side elevation of the pushing-leg, showing the spring and eyebolt thereof. Fig. 10 is a plan of crank-axle of the foot mechanism. Fig. 11 is a sectional elevation representing the beveled wheels upon the driving-axle of the motor, and shows one driving-wheel, (in dotted lines,) together with an arm-support for the reversing devices and (in dotted lines) main power-shaft and the bevel-wheel belonging to the friction-brake. Fig. 12 is a plan of the driving-axle, showing (in dotted lines) the position of the pedestal, the supporting-arm of the reversing-levers, and (in full line) two beveled wheels upon the driving-axle, an arm carrying main power-shaft, two pinion-wheels, and (in dotted lines) a collar on the driving-axle to keep this arm in position. Fig. 13 is a plan of the intermediate levers or beams that connect with the beam F, that has the springs and a yoke connecting the balance-beam with the foot mechanism. Fig. 14 is an isometrical view of the foot mechanism, showing one driving-wheel and a part of the connecting-rod for the driving-wheel; also the driving-lever. Fig. 15 is a sectional side elevation of the spring-clutch on the shaft, showing the bevel-wheel and the driving-pinion therefor.

In all the figures the same letters refer to the same parts.

The motor is carried by four driving-wheels, A, having front and back axles, the rear axle marked B and the front axle B'. In the middle of axle B', Fig. 12, is the collar $B^2$. (Shown in dotted lines.) The collar $B^2$ is to hold the arm $B^3$ in position on the axle B' and the arm $B^3$ is provided with three separate journal-caps, $B^4$, $B^5$, and $B^6$. Cap $B^4$ holds the arm $B^3$ on the axle, and the intermediate shaft, C, is journaled on the arm $B^3$, and carries the bevel-wheels C' $C^2$, and to hold this shaft in place in the journals the caps $B^5$ and $B^6$ are provided. On top of the arm $B^3$ is the swiveled journal $B^{11}$, carrying the shaft D. The bevel-wheels C' $C^2$ are keyed to the intermediate shaft, C, and the beveled wheels $B^7$ and $B^8$, that are upon the driving-axle B', are made to slide on keys $B^9$ and $B^{10}$. By this construction the motor can be reversed according to which wheel is intergeared with the wheel C'. The wheels $B^7$ and $B^8$ are divided wheels, and capable of being placed over the axle B' and bolted together. Wheel $C^2$ intergears with wheel $C^3$. This wheel belongs to the cover $C^5$ of a friction-brake, as called for in Letters Patent No. 365,273, dated June 21, 1887. This cover $C^5$ (see Figs. 2 and 3) is attached or detached by the friction-strap worked by the clutch $K^4$ on the shaft D, and the clutch $K^4$ is connected to the driving-lever K of the motor by ordinary rods, K'. Swivel-journal $B^{11}$ of the arm $B^3$ carries shaft D and the friction-brake.

At the back end of the motor is the motive power incased at D', so as to prevent dust from interfering with the apparatus. Upon the shaft D there is provided the clutch $D^2$. This connects to a pinion-wheel, $D^3$, and below the shaft D to a pinion, $D^4$, (see Fig. 4,) that runs loosely on the shaft $D^5$. Secured to the end of the shaft $D^5$ is a bevel-pinion, $D^6$. This shaft runs in proper journals, as shown by the frame 1; also, there is on the shaft a long key, $D^8$, (see Figs. 4 and 15,) which goes up into a recess of a sleeve belonging to the spring-clutch $D^7$, a construction common to sliding clutches. This clutch connects to a loose wheel, $D^4$, that is upon the shaft $D^5$, and the motive power is connected to this wheel $D^4$ by the clutch $D^2$ through wheel $D^3$, and by this clutch $D^7$ and its key $D^8$ on the shaft to the pinion $D^6$; but should the beveled pinion $D^6$ have power applied to it faster than that derived from the motive power of the motor as transmitted through the clutch $D^2$, wheels $D^3$ and $D^4$, then the clutch $D^7$ would fall back on the serrated face thereof and permit the shaft $D^5$ to revolve with the wheel $D^6$, which motion would be faster than the speed of wheel $D^4$. The wheel $D^6$ would be thus operated when the wheel $D^9$ moves ahead by means of the force applied by turning around the crank-axle $D^{10}$. This wheel $D^9$ is keyed upon the crank-axle $D^{10}$, and the axle is provided with opposite side cranks, $D^{11}$, and cam-wheel $D^{16}$. These cranks have the connecting-rods $D^{12}$, (see Figs. 2 and 14,) and they connect to the slide-guide $D^{13}$, belonging to the frame of the motor. The rods on which this guide slides are clearly shown in this application, as well as patents before cited, the loop H, and spring I upon the pushing-leg, as well as the strut $H^2$, that is to hold the foot square to its work. (See Figs. 8, 9, and 14.) The upper end of the pushing-leg is held by the connecting-rod $D^{12}$ to the guide $D^{13}$, and the object of this construction is to permit a certain amount of motion of the foot without altering the position of the crank-axle.

The foot $D^{15}$ is constructed as set forth in Letters Patent No. 365,273, dated June 21, 1887, (see Figs. 1, 2, 3, 4, 5, and 7 of that patent,) and it connects with the thrust-rod $F^7$, (see Figs. 2 and 14 of the drawings here presented,) which connects by an eye or clevis to the balance-beam $F^5$. (See Figs. 5 and 14.) This beam is connected to a counter-weight, $F^6$, that hangs from the end of the balance-beam, and below the balance-beam is shown a beam, F, and this beam F is provided with a yoke, F', and spring $F^2$. The yoke F' works against guides $F^3$ on the balance-beam $F^5$ and connects to a counter-beam, $F^4$, that is attached to a spring, $F^9$. This last spring attaches to the counter-weight F⁶. The beam F at one end has a spring, F⁸, and this spring reaches up and attaches to the beam F⁵. This spring is capable of being tightened by a screw-bolt, $f$, on the top of the beam F⁵. Alongside of the beam F and upon the same center bolt, D²⁰, is an intermediate beam, D¹⁹, with bolt F¹⁰ at one end. (See Figs. 13 and 14.) Bolt F¹⁰ connects the intermediate beam, D¹⁹, to the beam F, when desired, by means of the driving-lever G, and makes the raising and lowering devices of the foot automatic with those that move the pushing-leg in a horizontal direction. Thus when the connecting-rod D¹⁸ pulls down the intermediate beam, D¹⁹, the beam F is thrown up. If the bolt F¹⁰ connects it to the beam D¹⁹, and if the foot D¹⁵ is arrested by the ground and the connection F¹⁰ to the beam F is attached, then the beam is forced to rise to the height regulated by the cams, and thereby compresses the spring F² and stretches the springs F⁸ and F⁹. The connecting-rod D¹⁸ connects to the lever D¹⁷, and pulls down the rod D¹⁸ by being operated by the roller-cams D¹⁶ on the crank-shaft D¹⁰. (See Figs. 2, 4, and 14.) This construction is shown in dotted lines in Fig. 2.

Both sides of the motor are alike, making two feet. The cranks are set at opposite sides of the crank-axle. Should the foot mechanism by accident be started, so as to take the ground when the motor was moving quicker than the movement due to the foot mechanism, then the foot D¹⁵ and pushing-leg will slide at the loop H, and if that is not sufficient will pull around the crank-axle and with it the wheel D⁹ and cams D¹⁶ and turn the wheel D⁶ on shaft D⁵. The spring-clutch D⁷ will fall back and allow the slip of the foot, and the cam-wheels D¹⁶ will go over and release the foot from the ground, permitting the foot to pass along with the speed of the motor until the foot is raised from the ground by the turning of the crank-axle and cams, as hereinbefore explained.

The central frame, I, of the motor carries the crank-axle D¹⁰, the shaft D⁵, and the levers D¹⁷. The top of the motor is removable by eyebolts Q, permitting it to be lifted off. (See Fig. 1.) The box D' contains the delicate motive power that is intended to be run at a high speed, and is thus protected from dust.

The driving-lever K is attached by rods K' to the clutch K⁴ of a friction-brake of any desirable description, or as shown in Patents No. 212,358, dated February 18, 1879, or No. 330,576, November 17, 1886; and other arms, $k$, connect the driving-lever K, with the rods K², to the brakes of the driving-wheels of the motor K³, and is an improvement on Letters Patent No. 137,421, dated April 1, 1873, wherein a wheel is shown to operate the brakes, and a belt-tightening device. The lever G operates the clutch D² to start the feet swinging back and forth, and by fully forcing out the lever G the bolt F¹⁰ is made to connect to beam F and make the feet take the ground by the operation of the beam F, as heretofore explained.

Pedestal bolts M are in the frame E, (see Fig. 1,) and these bolts hold down the motive power. In front of the motor are guides N, rest-board N', and lines N². At the back of the motor, connecting it to the car, are two sets of lazy-tongs, one on each side of the motor, to prevent people from going in upon the track between motor and car. These lazy-tongs O are made of slats O'. The motor is provided with an oil-can, P, in a high-up position back of the driver, and connected by pipes to the high-speeded journals of the motor, enabling the driver to oil the motor with great ease.

This motor can be run with any motive power—steam, electricity, compressed air, or gas-engine. The inclosed place D' is provided therefor, and is situated above the frame of the motor.

The operation of my invention is as follows: The motive power runs at a fixed speed, which is governed by a governor, and to start and drive my motor the lever K is pushed out. By doing so a clutch, K⁴, of a friction-brake attaches the running-shaft D to the beveled wheels C³, C², and C'. These latter belong to the arm D³, which is sustained by the axle B', and the power is transmitted to beveled wheels B⁷ or B⁸, whichever may be in gear with bevel-wheel C', thus giving the direction in which the driving-wheels will turn, as it is not intended to reverse the motive power of the motor. When both wheels B⁷ and B⁸ are out of gear, then the duplex feet alone control the traction of the motor. By pulling lever K backward it frees the friction-brake and detaches the motive power of the motor from the driving-wheels, and by continuing to pull back this lever applies the brakes of the motor's driving-wheels. I prefer the solid friction-clutch K⁴ to a belt or wire rope, as set forth in Letters Patent No. 137,421, dated April 1, 1873, and a lever instead of a wheel, as there shown. The feet of the motor are started working from the power of the main shaft D by the lever G operating the clutch D², and should they strike the ground with the motor rolling faster than the motion that is given to them by the motive power of the motor, then the contact with the ground will permit the foot to slip the loop H, and, if this is not sufficient, revolve the crank-axle and cams without stopping the motor. This result is accomplished by the spring-clutch D⁷, permitting this slip.

The object of this invention is in especially doing away with the air and water and steam cylinders for working the foot mechanism of a motor. This is accomplished by cams, crank-axle, connecting-rods, and spring-beams, and a slipping clutch device, as hereinbefore stated, being improvements on Letters Patent No. 335,479, dated February 2, 1886, and No. 365,273, dated June 21, 1887.

What I claim as my invention, and desire to secure by Letters Patent of the United States, is as follows:

1. A traction-motor provided with a balanced foot and springs, for the purposes set forth, said foot being operated by rod, crank, connecting-rod, and cam, substantially as described.

2. In a traction-motor, the combination, with a balanced foot and springs, of the clutch escapement and connecting mechanism, said clutch escapement being arranged to permit the movement of the foot by ground contact, substantially as and for the purpose set forth.

3. A traction-motor provided with elastic foot mechanism, comprising a balance-beam, thrust-rod, counter spring beam, crank-axle, cams, and connecting-rod, and a spring-clutch, whereby independent foot movement is permitted, substantially as and for the purpose set forth.

4. A traction-motor provided with a driving-lever, combined by rods to the brakes of the driving-wheels of the motor, and to a clutch of the friction brake on the motor, as and for the purposes set forth.

5. The foot on the pushing-leg of a traction-motor adjusted by connections to be pressed elastically on the ground by cams, spring-beams, and a thrust-rod, also operated by connecting-rod and crank-axle sliding on and between guides in the motor, substantially as and for the purpose set forth.

6. The pushing-leg of a traction-motor provided with the elongated loop and an operating eye and strut to brace the foot squarely to said leg, as and for the purposes set forth.

7. The combination, with a traction-motor or other vehicle, of a foot device having the following elements: a pushing-leg having a foot braced squarely in the direction of the thrust of said pushing-leg, a thrust-rod adapted to hold it squarely upon the ground, beams, spring-beams, and counterbalanced beams, all combined with motive power, substantially as and for the purposes set forth.

8. In a traction-motor, a foot mechanism consisting of a row of claws with rubber backing, adapted to be held squarely on the ground by a thrust-rod, and having a pushing-leg operated by connecting-rod and crank-axle, said crank-axle provided with cams to operate connecting-rods and spring-beams, and a balance-beam connected to said thrust-rod, combined substantially as shown, and for the purposes as set forth.

9. In a traction-motor, a driving-axle provided with a flange and keyed on driving-wheels, with sliding beveled pinions and fixed central collar, combined with a removable arm, provided with removable intermediate shafts, and surmounted with swiveled box for main motive-power shaft, operated by a friction-brake, substantially as and for the purpose set forth.

In testimony whereof I affix my signature in presence of two witnesses.

BENJAMIN CHARLES POLE.

Witnesses:
PARKER H. SWEET, Jr.,
H. S. ROHRER.